O. BOYER.
TRACTOR WHEEL.
APPLICATION FILED FEB. 17, 1920.
1,412,999.
Patented Apr. 18, 1922.
2 SHEETS—SHEET 1.
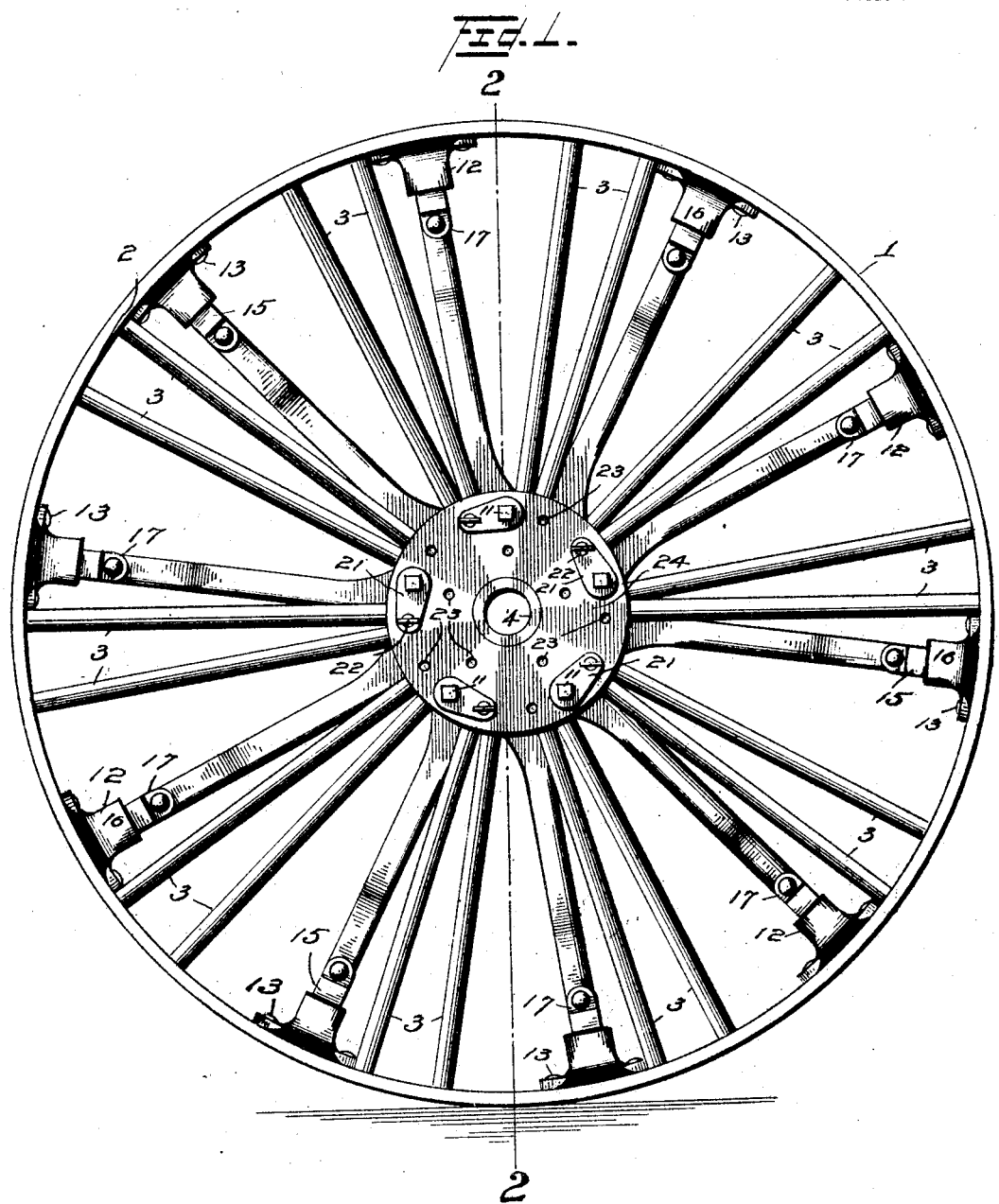
WITNESSES
E. C. Duffy
H. T. Chapman
INVENTOR
Oliver Boyer
BY
ATTORNEY O. BOYER.
TRACTOR WHEEL.
APPLICATION FILED FEB. 17, 1920.
1,412,999.
Patented Apr. 18, 1922.
2 SHEETS—SHEET 2.
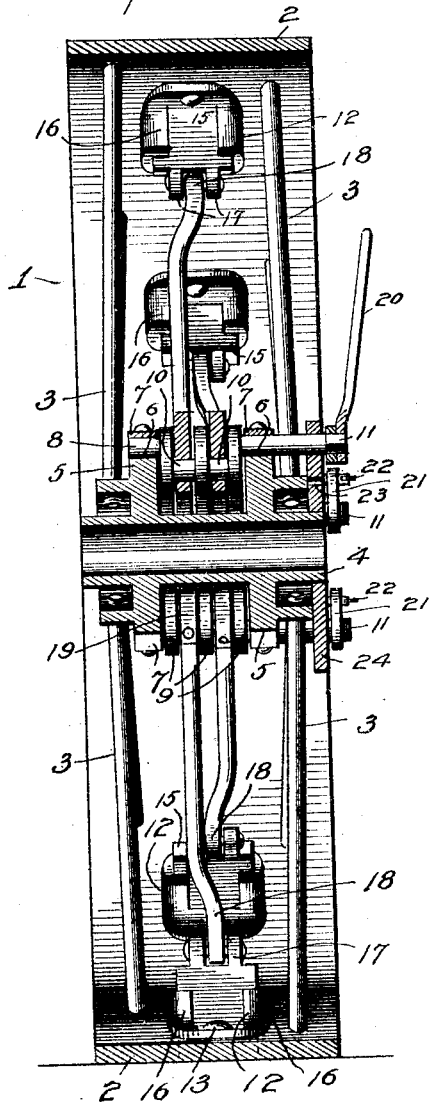
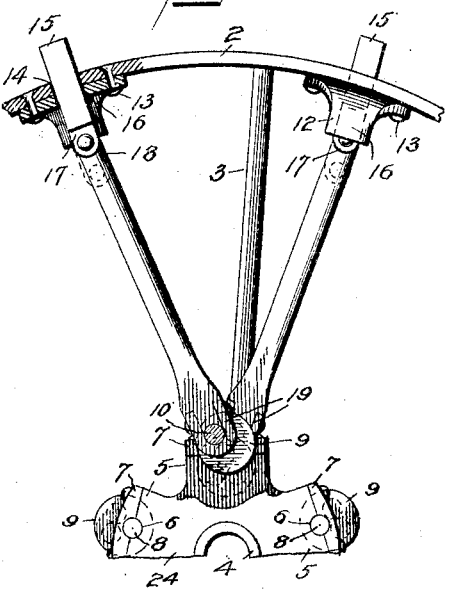
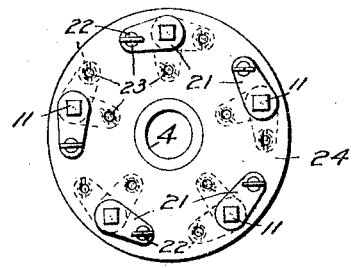
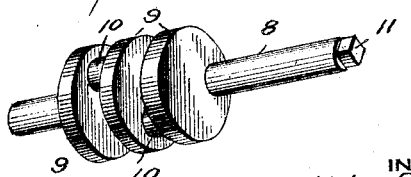
WITNESSES
E. C. Duffy
F. T. Chapman
INVENTOR
Oliver Boyer
BY
ATTORNEY

UNITED STATES PATENT OFFICE.

OLIVER BOYER, OF SPENCERVILLE, OHIO.

TRACTOR WHEEL.

1,412,999.　　　　Specification of Letters Patent.　　Patented Apr. 18, 1922.

Application filed February 17, 1920. Serial No. 359,261.

*To all whom it may concern:*

Be it known that I, OLIVER BOYER, a citizen of the United States, residing at Spencerville, in the county of Allen and State of Ohio, have invented a new and useful Tractor Wheel, of which the following is a specification.

This invention has reference to tractor wheels, and its object is to provide a tractor wheel with projectable and retractable spurs or tractors permitting the spurs to be withdrawn until flush with the rim of the wheel or projected into ground-engaging position when full tractive effect is desired. In this manner, harm to paved roadways is avoided while the tractor wheel may be utilized to advantage on soft ground or on unimproved roads.

The invention is an improvement upon my prior Patent No. 1,202,785, for a traction wheel, granted Oct. 31, 1916.

In the said Letters Patent the construction is such that three tractor devices or spurs are under the control of a single actuating device and each actuating device comprises a similar number of cams mounted on a shaft common thereto. In accordance with the present invention, a crank shaft with two cranks, which may be all in one piece, is utilized for actuating two tractors, instead of three as in the aforesaid Letters Patent. This is productive of greater ease of operation and less wear on the working parts, as well as elimination of side play.

The invention also includes guide bearings embracing but a portion of the circumferential extent of the spurs or tractors so that liability of clogging and wear, especially in muddy roads, is greatly reduced, and moreover the guides are self-cleaning, this also contributing to ease of adjustment and the reduction of wear.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Fig. 1 is an elevation of a tractor wheel embodying the invention.

Fig. 2 is a section on the line 2—2 of Fig. 1.

Fig. 3 is a fragmentary view showing two adjacent spurs or tractors projected.

Fig. 4 is a face view of one end of the hub of the wheel showing positions of the parts in different adjustments.

Fig. 5 is a perspective view of one of the crank shafts used in the hub of the wheel.

Referring to the drawings, there is shown a wheel 1 having a rim or tread 2 of the usual broad flat type employed in tractor wheels. Connected to the rim by spokes 3, which may be of usual type, is a hub 4 in the form of a sleeve with circumferential series of axially spaced radial lugs 5 grouped in pairs, with the lugs of a pair a sufficient distance apart to accommodate certain mechanism to be described. Each lug has a journal bearing 6 therein provided with a cap 7 completing the bearing, and the bearings in any pair of axially spaced lugs are in alinement in the direction of the thickness of the wheel. Seated in each pair of alined bearings is a shaft 8, there being as many shafts as there are bearings, and in the particular showing of the drawings five such shafts are mounted in the wheel. It is to be understood, however, that the particular number of shafts employed may vary, large wheels permitting the use of a greater number of shafts than small wheels. Each shaft 8 has its end portions alined and between the end portions is provided with a suitable number of joined crank disks 9, the conjunction of the disks being through appropriately related crank pins 10. The end portions of the shaft 8, the crank disks 9 and the crank pins 10 are or may be in one piece. One end of each shaft 8 terminates in an extension squared as shown at 11, or is otherwise appropriately shaped to receive a manipulating tool 20 whereby the crank shaft may be rotated at the will of an operator. The crank pins 10 are eccentric to the axis of the shaft 8 and the disks 9 are also eccentric to the shaft 8 with the pins 10 eccentric to each other and to the disks 9. The arrangement is such that when the shaft 8 is turned to a certain position, both pins 10 are equidistantly spaced from the wheel rim 2.

At chosen intervals about the inner face of the rim 2, guides 12 are secured by rivets 13 or in any other appropriate manner and these guides match perforations or passages 14 through the rim. The guide blocks and passages are designed to receive, guide and brace traction devices 15, either in the form of rectangular blocks or of any other suitable form, permitting the blocks to slide through the guides into projected relation to the outer face of the wheel rim or be retracted until substantially flush therewith. The guides 12 are open guides in that they are provided with side wings 16 embracing the edges of the blocks 15 between them. The wings 16, in conjunction with the perforations 14, constitute the sole guides for the traction devices or blocks 15 and the blocks are free to move through and beyond the guides 12 with their side wings 16 toward the axis of the wheel 1. With this construction, there is no place to pocket dirt or to permit it to compact and interfere with the free movement of the blocks 15. The inner end of each block 15 is provided with a pair of ears 17 to which is pivoted one end of a link 18, the other end of the link carrying a bearing strap 19 encircling a corresponding one of the pins 10.

When a shaft 8 is rotated by a tool 20 applied to the squared end 11 of the shaft, the eccentricity of each pin 10 to the axis of rotation causes a movement of a link 18 to produce the projection or retraction of the block 15 to which the link is attached. By applying the tool 20 to the different shafts 8 and rotating them in the appropriate direction, all the blocks or traction devices 15 may be projected beyond the periphery of the rim 2, whereby the wheel 1 is converted into the traction wheel, or the traction devices 15 may be retracted until flush with the rim 2.

In order to hold the shafts 8 in certain chosen positions, crank plates 21 are applied to the squared ends 11 of said shafts so as to turn with them, the squared ends 11 being long enough to permit the presence of the plates 21 and to project therebeyond to receive the crank handle or tool 20. Each crank plate 21 carries at the outer or free end a set screw 22 adapted to enter any one of a series of sockets 23 in a face plate 24 at the appropriate end of the hub of the wheel. The sockets 23 are so situated that when the set screw 22 is in one of them, the traction blocks 15 are all fully retracted, and when set in another one of the sockets the traction blocks are fully projected. When the set screw 22 is in the third one of the sockets 23, there being three such sockets to each shaft 8, the traction devices or blocks 15 are partially projected so that an operator has a choice of adjustment of the traction devices in accordance with the character of the ground over which the wheel is moving.

By making the means for projecting and retracting the tractor devices as a one-piece structure composed of spaced crank disks with alined shaft end portions, the manufacture is simplified and cheapened and the assembling of the wheel is made easier and may be done by relatively cheap labor, besides improving the hub structure over that shown in the aforesaid Letters Patent. Furthermore, the crank disks serve to steady the connecting links to the traction blocks and avoid the necessity of special provision to prevent side movement.

What is claimed is:—

1. A tractor wheel provided with extensible and retractable tractor devices or blocks, with each tractor device provided with a guide fast to the inner face of the rim of the wheel, said guide having opposed laterally separated wings in embracing relation to lateral edges only of the tractor devices, whereby each tractor device is free from the guides at the front and rear and is therefore self-cleaning.

2. A tractor wheel provided with a substantially flat rim having a circumferential series of passages therethrough, guides on the inner face of the rim each matching a respective one of the passages, with the guides provided at laterally opposite sides with facing wings spaced apart laterally of the rim, and projectable and retractable tractor devices slidable through the guides and at the edges only embraced by the wings, whereby the tractor devices are supported by the guides and are self-cleaning.

In testimony, that I claim the foregoing as my own, I have hereto affixed my signature.

OLIVER BOYER.